(12) United States Patent
Ulrich et al.

(10) Patent No.: US 12,535,244 B2
(45) Date of Patent: Jan. 27, 2026

(54) SENSOR DEVICE AND CONDENSATE WATER REMOVAL DEVICE WITH A SENSOR DEVICE

(71) Applicant: REFCO Manufacturing Ltd., Hitzkirch (CH)

(72) Inventors: Manfred Ulrich, Kastanienbaum (CH); Michael Oswald, Lucerne (CH); Matthew MacDonell, Peacehaven (GB)

(73) Assignee: Refco Manufacturing Ltd., Hitzkirch (CH)

( * ) Notice: Subject to any disclaimer, the term of this patent is extended or adjusted under 35 U.S.C. 154(b) by 217 days.

(21) Appl. No.: 18/202,485

(22) Filed: May 26, 2023

(65) Prior Publication Data
US 2023/0383989 A1    Nov. 30, 2023

(30) Foreign Application Priority Data

May 30, 2022 (DE) .................. 10 2022 113 588.8

(51) Int. Cl.
*F24F 13/22* (2006.01)
*F24F 11/30* (2018.01)
(Continued)

(52) U.S. Cl.
CPC .......... *F24F 13/222* (2013.01); *F24F 11/30* (2018.01); *G01F 23/2925* (2013.01); *G01V 8/22* (2013.01);
(Continued)

(58) Field of Classification Search
CPC .... F24F 13/222; F24F 2140/30; F24F 12/222; F25D 21/02; G01F 23/2922; G01F 23/2925
See application file for complete search history.

(56) References Cited

U.S. PATENT DOCUMENTS 4,946,242 A * 8/1990 Tanno .................. G01F 23/2927
356/28
5,562,003 A    10/1996 Lefebvre
(Continued)

FOREIGN PATENT DOCUMENTS

CN     201247089 Y     5/2009
EP     2657727 A1 * 10/2013 ............ G01J 1/0271
(Continued)

OTHER PUBLICATIONS

Extended European Search Report dated Oct. 16, 2023 in corresponding applicaton 23175554.7.

*Primary Examiner* — Jerry-Daryl Fletcher
*Assistant Examiner* — Daniel C Comings
(74) *Attorney, Agent, or Firm* — Muncy, Geissler, Olds & Lowe, P.C.

(57) ABSTRACT

A sensor device for detection of water, having an inlet connector with an inlet opening, and at least one sensor element, wherein the inlet connector is exposed to or connected to a source of water, the inlet opening forms at least a part of a reservoir for reception of the water from the source of water, the reservoir is in fluid communication with a vent that vents the reservoir to the surrounding air and the sensor element is positioned within or adjacent to the inlet opening and/or the reservoir, such that it protrudes into the reservoir or forms an interface of the reservoir.

15 Claims, 6 Drawing Sheets

(51) Int. Cl.
    *F25D 21/02*     (2006.01)
    *G01F 23/292*     (2006.01)
    *G01V 8/22*     (2006.01)
    *F24F 140/30*     (2018.01)

(52) U.S. Cl.
    CPC ... *F24F 2013/227* (2013.01); *F24F 2013/228* (2013.01); *F24F 2140/30* (2018.01); *F25D 21/02* (2013.01)

(56) References Cited

U.S. PATENT DOCUMENTS

| | | | |
|---|---|---|---|
| 5,765,994 A * | 6/1998 | Barbier | F04B 39/0207 |
| | | | 62/193 |
| 2003/0097855 A1* | 5/2003 | Rovira-Adame | F25D 21/14 |
| | | | 62/277 |
| 2009/0064698 A1* | 3/2009 | Spanger | F24F 13/222 |
| | | | 62/289 |
| 2018/0216871 A1 | 8/2018 | Potorti | |
| 2018/0231412 A1 | 8/2018 | Newman et al. | |

FOREIGN PATENT DOCUMENTS

| | | | |
|---|---|---|---|
| JP | 2003262355 A | 9/2003 | |
| WO | WO-2021171253 A1 * | 9/2021 | F24F 13/20 |

\* cited by examiner

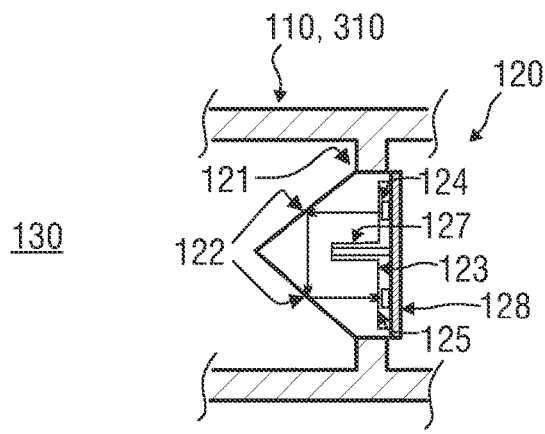
FIG 5.1
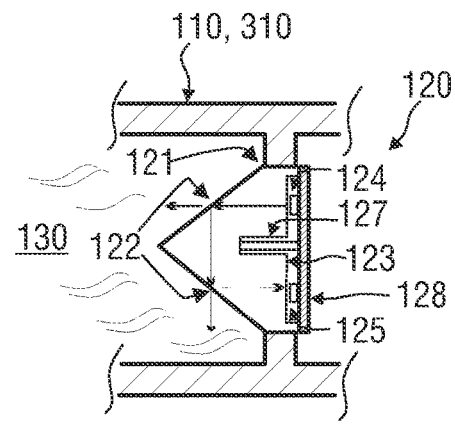
FIG 5.2
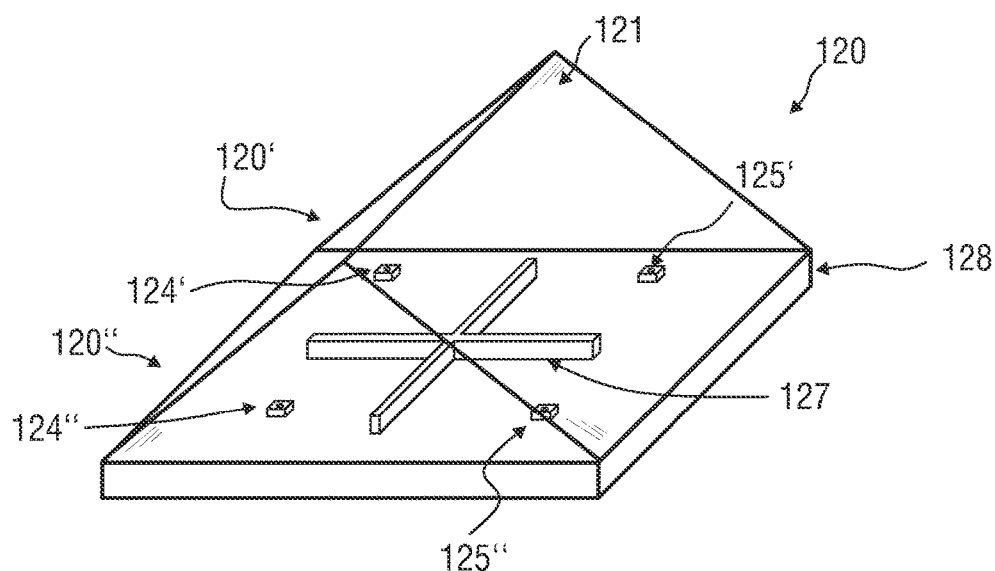
FIG 6

SENSOR DEVICE AND CONDENSATE WATER REMOVAL DEVICE WITH A SENSOR DEVICE

This nonprovisional application claims priority under 35 U.S.C. § 119(a) to German Patent Application No. 10 2022 113 588.8, which was filed in Germany on May 30, 2022, and which is herein incorporated by reference.

BACKGROUND OF THE INVENTION

Field of the Invention

The present invention relates to the field of sensor devices for the detection of water and condensate water removal devices in combination with such sensor devices.

Description of the Background Art

Devices, systems and equipment from the field of heating, ventilation, air conditioning and refrigeration—which are collectively referred to as 'HVACR systems' throughout this document—comprise refrigeration cycles with condenser units or similar units. These condensers tend to produce condensate water, which is typically collected by a so-called drip tray or condensate water tray, that is arranged below the condenser.

For the sake of clarification, the previously introduced term 'HVACR systems' shall apply in particular, but not exclusively, to any kind of air conditioners, (gas) heaters, thermal heat pumps, condensing (gas) boilers, and so on.

If increasing amounts of condensate water accumulate in the drip tray of a HVACR system, it can lead to overflow of the condensate water and can seriously damage the HVACR system and/or the building or structure, where the HVACR system is installed. Furthermore, if the condensate water remains in the drip tray for longer periods of time, mould and/or algae can form inside the drip tray, generating unpleasant odours and/or even air pollution that is hazardous to health.

It is therefore necessary to remove the condensate water from the drip tray. For smaller and/or portable HVACR systems, the drip tray may be manually removable so that a user may empty the drip tray periodically. Other units, especially those with non-removable drip trays, support the removal of the condensate water via a drain. Typically, a condensate water hose (also referred to as condensate water tube or pipe) will be connected to a drain port of the drip tray and condensate water is removed via this hose. In some installations it is possible to root the condensate water hose in a way that allows the condensate water to be drawn from the drip tray through the condensate water hose by gravity (hence, a so called 'gravity drain'). However, it is often not possible to root the condensate water hose accordingly, so a condensate water pump needs to be connected to the condensate water hose. It will pump the condensate water out of the drip tray and towards a drain.

Many kinds of such condensate water pumps are known in the field from many different manufacturers. To improve efficiency and extend service life of the condensate water pump, it is well-known that it is particularly useful to combine a condensate water pump with a component to sense the presence of condensate water or even the amount of present condensate water or to incorporate such component with the condensate water pump. Such devices are referred to as 'condensate water removal devices' throughout this document.

In the technical field, various designs have been established which implement this feature and which are explained below on the basis of some product examples of the applicant:

The REFCO COMBI condensate pump with its separate pump unit and water sensor unit is an example of a type of condensate water removal devices that are referred to as 'split pump devices' throughout this document. The condensate water sensor unit is connected to the drain port of the drip tray by a first condensate water hose or pipe. For this, it comprises an inlet connector with a water inlet hole. A housing of the water sensor unit forms a reservoir, that receives the condensate water from the first condensate water hose. A water sensor is arranged inside this reservoir, to sense the presence and/or amount of water inside the reservoir. While the REFCO COMBI uses an electrical sensor to detect the condensate water, systems with floats are used by most condensate water sensor units in the market today, although they are prone to failure, e.g. by getting stuck and/or because of non-planar installation. When the water sensor detects the presence of water (or a certain amount of water) inside the reservoir, it will provide a signal or indication to the pump unit, typically by ways of an electronic connection between both units. Furthermore, both units are connected to each other by a second condensate water hose or pipe. Activated and/or controlled by the signal of the water sensor unit, the pump unit will start pumping, removing the water from the reservoir of the water sensor unit and conveying it towards a drain.

The REFCO GOBI II condensate pump with its integrated drip tray, water sensor and pump unit is an example of a type of condensate water removal devices that are referred to as 'integrated pump devices' throughout this documents. Such devices are ideal for direct mounting below a HVACR-system, particularly below the typical wall mounted indoor air conditioners. Condensate water from the HVACR-system is guided to a hole in the bottom side of the system, where the integrated pump set is mounted with its integrated drip tray. The drip tray collects the water that drops down from the hole. The integrated water sensor will sense the presence and/or amount of collected condensate water and will at some point activate the pump to remove it.

The REFCO KAROO condensate pump with its integrated water sensor and pump unit is an example of a type of condensate water removal devices that are referred to as 'submersible pump devices' throughout this document. Such devices comprise an opening or several openings, that allow condensate water to enter an input opening of the pump, when the pump is placed at the ground of a drip tray which is then filled with condensate water. A water sensor attached to the unit detects the presence and/or depth of condensate water surrounding the submersible pump and will activates the pump to remove the condensate water, if any water is present or reaches a set limit value.

All of the above-mentioned setups use a water sensor to sense the presence and/or amount of condensate water, thereby enabling an automatic and efficient control of the pumps. Such water sensors can also be referred to as sensor devices.

SUMMARY OF THE INVENTION

It is the object of the present invention to provide improvements for sensor devices, i.e. sensors, for the detection of water and for condensate water removal devices, i.e. condensate water remover, to allow a more flexible and versatile use of such devices.

According to an aspect of the invention, a sensor device for detection of water comprises an inlet connector with an inlet opening, and at least one sensor element. The inlet connector is exposed to or connected to a source of water, e.g. the inlet connector may be adapted to sealingly fit into a condensate water hose or a drain port of a drip tray of an HVACR system. The inlet opening forms at least a part of a reservoir for reception of the water from the source of water. That the reservoir forms 'at least a part' of the reservoir can mean that the inlet opening may be in direct fluidic connection with other volumes, e.g. like condensate water hoses or chambers of housings as explained further down below, that form the reservoir together. In such examples, a larger reservoir can be used, therefore increasing the amount of water that can be received and temporarily stored in the reservoir. For example, a condensate water removal device, which incorporates the sensor device, may be operated more efficiently, as a larger amount of water can be removed from the reservoir at once and a pump unit, i.e. pump, of the condensate water removal device can then be turned off for a longer period of time, until a certain amount of water has again accumulated in the larger reservoir. However, the reservoir could also be formed by the inlet opening alone, therefore minimizing the size of the sensor device. At the same time, the response time of the sensor device can be reduced, as a small reservoir which is formed by the inlet opening alone, will only need to receive a small amount of water until a detectable filling level is reached.

The reservoir may be in fluid communication with a vent, that vents the reservoir to the surrounding air, therefore preventing a siphon effect of the sensor device.

The above-mentioned vent can be a small vent that is directly comprised by the sensor device, e.g. directly connected to the inlet connector. In further examples, the vent is not comprised by the sensor device itself, but is nevertheless in fluid communication with the reservoir.

According to the present invention, the sensor element is positioned within or adjacent to the inlet opening such that it protrudes into the reservoir or forms an interface of the reservoir. Therefore, the dimensions of the sensor device are basically given by the dimensions of the inlet connector, i.e. the sensor device is very small, light in weight and can be used in many applications, as explained herein. Neither the sensor device nor any superordinate unit, e.g. a condensate water removal device that comprises the sensor device, requires a housing that incorporates a sensor and/or a distinct reservoir.

According to an example in which the reservoir is formed not alone by the inlet opening, the sensor element can be generally positioned within or adjacent to the reservoir, i.e. any part of the reservoir and not necessarily that part, which is formed by the inlet opening. That way, the sensor element can be positioned more flexibly, the exchange and/or maintenance of the sensor device or sensor element is easier and a wider variety of sensor devices can be used, as they do not need to fit into the inlet opening.

The sensor device can comprise at least two sensor elements, particularly three sensor elements, which are positioned at different locations within or adjacent to the inlet opening and/or the reservoir. Therefore, the sensor device not only is able to detect the presence or absence of water at the position of one sensor element, but it is able to detect water at several locations. Particularly, the sensor elements are distributed along a measuring axis. That enables the sensor device to detect the rise and fall of the water level relative to that measuring axis, therefore the sensor element can determine the amount of water present in the reservoir.

The reservoir can be formed at least in part by the inlet opening of the inlet connector and by an internal volume of a first condensate water hose. The condensate water hose is connected with one end to the inlet opening of the sensor device, therefore the internal volume of the hose is in direct fluidic connection with the inlet opening. The other end of the first condensate water hose is connected to a source of water, e.g. a drain port of a drip tray of an HVACR system. Particularly, the width of the inlet opening covers at least 50%, in particular at least 75% or 85%, of the width or diameter of the internal volume of first condensate water hose. As a result, the water level in both volumes rises approximately equally and simultaneously, so that a reliable measurement of the amount of water in the reservoir is achieved by the one or more sensor elements, which are positioned within or adjacent to the inlet opening and/or the reservoir.

The first condensate water hose may be detachably connected to the sensor device, which enables a quick replacement of the hose and/or the compatibility to hoses of different length. However, the condensate water hose may alternatively be integrally formed with the inlet connector, therefore reducing the risk of leaks.

The condensate water hose can comprise a corrugated hose section. Such corrugated hose section is particularly reliable, as it can be bend in different directions easily, however, it is much less likely to kink compared to non-corrugate hoses. Particularly, the corrugate hose section is also extensible, therefore being adaptable to even more different installation situations.

The first condensate water hose can comprise a filtering device. For example, the filtering device comprises a small sponge, which is pushed into the hose, preferably near a distal end of the hose.

The condensate water hose can comprise a proximal end section adapted to connect to the inlet connector and a distal end section adapted to connect to a source of condensate water, e.g. a drain port of a drip tray. The distal end section comprises at least two connector sections with different opening widths, that adjoin each other. The connector sections are removably attached to the condensate water hose and/or each other. For example, the hose is made of rubber and the opening widths of the connector sections get smaller starting from the distal end. Thus, it is possible, that a user simply cuts off the sections that are too wide for a tight connection to the source of water, for example with a carpet cutter.

The inlet connector can be arranged on a first housing of a condensate water removal device. The first housing comprises an internal chamber, which is arranged adjacent to and in direct fluidic communication with the inlet opening. Thus, the reservoir is at least in part formed by the inlet opening and the internal chamber. For example, the sensor element may not be positioned within or adjacent to the inlet opening, but instead within or adjacent to the internal chamber of the housing, thereby satisfying the requirement of being positioned within or adjacent to the reservoir.

The benefits of a larger reservoir are combined with a still very small first housing, as the internal chamber of the housing does not have to form the reservoir of a desired size on its own. Instead, internal chamber and inlet opening form the reservoir together. Additionally, the sensor element or multiple sensor elements can be arranged within or adjacent to the internal chamber more conveniently.

As explained above, condensate water removal devices come in several different shapes and forms. In an example, where the condensate water removal device is of the type of a split pump device, the first housing may be the housing of a sensor unit, whereas a second housing may form a pump unit and comprises a pump to remove the water. Both units are connected via a second condensate water hose, such that the pump is in fluidic connection with the reservoir.

The condensate water removal device may comprise only the first housing, wherein a pump can also be integrated into the housing and in fluid communication with the reservoir/internal chamber via an internal fluid line. Such devices can be of the type of a submersible pump, wherein water enters the reservoir simply through the inlet opening as the device is submersed in water. In an example with only one housing, the device may be used similar to the above-mentioned split pump devices, i.e. being connectable to a source of water via a first condensate water hose that connects to the inlet connector of the sensor device. However, as pump and sensor elements are all integrated into one housing and the reservoir is formed at least in part by the inlet opening, the internal chamber of the housing and particularly also by the first condensate water hose, the condensate water removal device can be designed with very small size. That in turn may mean that it can be used in a very flexible and versatile way.

The sensor element can be adapted to generate an electric sensor signal, wherein the electric sensor signal is indicative of at least one of a presence or absence of water at a sensing surface of the sensor element, a pressure of a fluid in contact with the sensor element, a temperature of a fluid in contact with the sensor element, a thermal capacity of a fluid in contact with the sensor element, or a conductivity of a fluid in contact with the sensor elements. As a result, the sensor device is able to detect water reliably and the detection information can be processed easily by an electronics unit, that is connected to the sensor element and receives the electronic sensor signal.

The at least one sensor element can be an optical sensor. The sensor device comprises a transparent sensor body, which is arranged adjacent to the reservoir and comprises a prism-shaped or conical-shaped reflection face, which is facing towards the reservoir and is in contact with it. The at least one optical sensor comprises a set of one light emitter and one corresponding light receiver. E.g., the light receiver may be an LED (light emitting diode) and the light receiver may be a photo diode. The light emitter and light receiver are arranged adjacent to or integrated into a back surface of the sensor body, wherein the back surface is essentially opposite to the reflection face. Essentially opposite may mean that, while the reflection face faces towards the reservoir, the back surface faces away from it and is not in contact with it. However, the reflection face as well as the back surface may each comprise two or more surface sections with different orientation and none of the surface sections need to be parallel to another. The arrangement only needs to allow that the light of the light emitter is directed towards at least a section of the reflection face and the light receiver is positioned to receive light that is internally reflected back from the reflection face. The light receiver then provides an electronic sensor signal that is indicative of an amount of light reflected back from the reflection face. If no water is present at the position where the light from the light emitter is reflected, a majority of or essentially all of the light is reflected by internal total reflection. However, if water is present at the reflection face, the conditions of internal total reflection are not met and only a substantially lower amount of light is reflected towards the light receiver. An electronics unit is connected to the sensor element and is adapted to determine whether water is present or absent at the reflection face, based on the electronic sensor signal of the light receiver. The electronics unit may be part of the sensor device, e.g. on a printed circuit board of the sensor device. Particularly, the printed circuit board carries the light receiver, the light emitter and the electronic circuitry of the electronics unit at the same time. However, the electronics unit may as well be part of a superordinate unit, like a condensate water removal device that comprises the sensor device. The optical sensor is particularly useful, as it is reliable, accurate, highly integrateable, small in size and low in energy consumption.

The sensor device can comprise at least two optical sensors, wherein each one of the optical sensors comprises a set of one light emitter and one corresponding light receiver. However, the optical sensors do not have to utilize a separate sensor body each, but instead the sensor device comprises only one sensor body which has an elongate shape and extends along or in parallel to a measuring axis, along which the sensor elements are to be distributed. Each set of light emitters and light receivers is arranged adjacent to or integrated into a back surface of that one sensor body, which is essentially opposite to the reflection face, facing away from the reservoir, wherein the sets are positioned at different measuring positions along the measuring axis. The light of each one of the light emitters can be directed towards an individual section of the reflection face of the sensor body and the light receivers provide electronic sensor signals that are indicative of an amount of light internally reflected back from the reflection face and received by the light receivers. The electronics unit is connected to the sensor elements and is adapted to determine whether water is present or absent at each measuring position at the reflection face, based on the electronic sensor signals of the light receivers. The optical sensors are particularly useful, as they are reliable, accurate, highly integrateable and low in energy consumption. The integration of multiple sets of light emitters and light receivers into the back surface of one "shared" sensor body at different positions results in a very small and robust design, while enabling the sensor device to detect the presence or absence at multiple positions along the measuring axis. Therefore, the sensor device can be used as a level sensor.

The reflection face of the sensor body of the above-mentioned optical sensor or sensors can be coated with a mould-reducing compound or material; 'coated with' may mean that there is a layer of that material on top of the surface that is directed to and in contact with the reservoir or that the mould-reducing compound is directly integrated into the material of the sensor body. The mould-reducing compound may be any antimicrobial agent, that is suitable to reduce or eliminate growth of algae, mould and/or bacteria. Therefore, the sensor body of the sensor device needs to be cleaned much less frequently, as the functionality of the optical sensor or optical sensors will be much less effected by growth of algae, mould and/or bacteria.

At least one optical sensor can comprise a light emitter, that emits light of a wavelength of 500 nm to 550 nm or light of the near infrared spectrum. Light of that wavelength ranges is known to be harmful or at least not promotive to the growth of some algae, as that wavelengths cannot be absorbed by them as good as other wavelengths. Therefore, the growth of algae on the reflection face of the sensor body and any other surfaces that may be illuminated by the light emitter is effectively prohibited or at least reduced.

In another example of the sensor device with the optical sensor or optical sensors as mentioned above, the sensor device can comprise at least one shield that is arranged in between of the light emitter and the light receiver of at least one optical sensor and/or in between the sets of lights emitters and light receivers of different optical sensors. Particularly, the shield protrudes into the back surface of the sensor body, at least in part. The shield or multiple shields can effectively reduce the amount of stray light received by the light receivers, therefore increasing sensitivity and accuracy of the optical sensors.

In an example of the sensor device with the optical sensor or optical sensors as mentioned above, the inlet connector and/or the condensate water hose and/or the first housing of a condensate water removal device that comprises the sensor device can be formed by an essentially non-transparent and non-translucent material; 'essentially non-transparent and non-translucent' may mean that the material shall be able to effectively reduce the amount of light from the environment that reaches the light receivers, particularly by at least 50% or more. Particularly, the material is non-transparent and non-translucent for all wavelengths, which can be sensed by the light receivers.

The sensor device can comprise an UV-light emitter, that is adapted to emit ultra violet light onto the at least one sensor element. With the UV-light emitter directed onto the sensor element the sensor element is kept free of mould and/or algae.

An electronics unit may control the UV-light emitter to emit light onto the at least one sensor element periodically. The electronics unit may be connected to the UV-light emitter and to the at least one sensor element and may be adapted to control the UV-light emitter to emit light onto the at least one sensor element only when the presence of water in the reservoir is detected based on a signal of the at least one sensor element. This is particularly advantageous, when the sensor device comprises an optical sensor and a transparent sensor body as described above. The UV-light emitter may be arranged directly next to the light emitters and light receivers of the optical sensor on the same substrate. Thus, the transparent sensor body can be illuminated from behind. In this case, however, it could be that without water on the reflection face the UV-light is also totally internally reflected. Thus, the sterilizing effect would be nil. Further, the emission of UV light only when there is water ensures that even with the described optical sensors the UV light really hits the surfaces that come into contact with water or penetrates it and that the water itself and other surfaces within the reservoir can also be irradiated.

The sensor device may comprise an outlet port to connect the sensor device with other devices, for example a condensate water removal device as explained below. For example, the outlet port is arranged at an end surface of an intake pipe, wherein the end surface is tilted by 30° with respect to a horizontal plane. Tests have shown that this angle between the normal to the water surface and the intake opening produces significantly less noise and/or vibration when the water is sucked in.

The intake pipe can be L-shaped and arranged rotatably in a socket on an inner wall of the reservoir. Thus, the intake pipe can be adapted to different orientations of the device.

According to another aspect of the present invention, a condensate water removal device for removing water from an HVACR system comprises the sensor device of the present invention and/or any above examples of the sensor device, at least a first housing, a pump unit, an outlet connector with an outlet hole, and an electronics unit. The inlet connector of the sensor device is arranged on the first housing, the pump unit is adapted to pump water out of the reservoir of the sensor device via a fluid channel system that is connected to an outlet port of the reservoir and towards the outlet connector, and the electronics unit is electronically connected to the sensor element and adapted to determine a presence or absence of water and/or a level of water within the reservoir, and to provide a control signal, based on said detected presence and/or level of condensate water, to the pump unit. By the use of the sensor device of the present invention, all benefits and advantages of that sensor device transfer to the condensate water removal device, i.e. it is very reliable, small in size, lightweight, has a low energy consumption and can detect the presence and/or level of water inside the reservoir accurately.

The outlet port can be directly located adjacent to the inlet opening of the inlet connector. That arrangement contributes to a very small and light design of the condensate water removal device.

The reservoir can be further formed at least in part by an internal chamber of the first housing, which is arranged adjacent to and in fluid communication with the inlet opening of the inlet connector. The outlet port is located adjacent to that internal chamber. As already explained above with regard to an exemplary embodiment of the sensor device, this embodiment combines the benefits of a larger reservoir, which can receive and hold a larger amount of water and provides more space for the arrangement of multiple sensor elements, with a still very small first housing.

The first housing and/or the internal chamber can have a rectangular or square cross-section. The measuring axis of the sensor device extends along a diagonal line of the cross-section. As a result, for given maximum dimensions of height and width of the device and for a given size of each used sensor element, a higher number of sensor elements can be distributed along the measuring axis.

Particularly, the outlet port of the reservoir is positioned at one of the ends of the diagonal line. With this arrangement, the condensate water removal device can be operated in two different orientations, i.e. with either one of the two housing sides, that are adjacent to that corner, on the ground. Therefore, the device can easily adapt to different spatial requirements of a given application. In both orientations, the outlet port will be close to the lowest point of the reservoir, allowing for an efficient removal of water by the pump unit through the outlet port.

As already explained, condensate water removal devices come in several different shapes and forms. The pump unit can be incorporated into the first housing, wherein a pump inlet is connected to the outlet port of the reservoir via the fluid channel system within the first housing. Such devices can be of the type of a submersible pump, wherein water enters the reservoir simply through the inlet opening as the device is submersed in water. In an example with only one housing, the device may be used similar to the above-mentioned split pump devices, i.e. being connectable to a source of water via a first condensate water hose that connects to the inlet connector of the sensor device. However, as the pump unit, the reservoir and the sensor elements are all integrated into one housing and the reservoir is formed at least in part by the inlet opening, the internal chamber of the housing and particularly also by the first condensate water hose, the condensate water removal device can be designed with very small size. That in turn means that it can be used in a very flexible and versatile way.

The first housing may be the housing of only a sensor unit, whereas the pump unit is arranged within a second housing of the condensate water removal device. Both units are connected via a second condensate water hose, such that an inlet of the pump is in fluidic connection with the outlet port of the reservoir. The condensate water removal device can be of the type of a split pump device, and therefore particularly easy to repair and adaptable to certain spatial requirements of different applications.

The outlet port can be arranged at an end surface of an intake pipe, wherein the end surface is tilted by 30° with respect to a horizontal plane. Tests have shown that this angle between the normal to the water surface and the intake opening produces significantly less noise and/or vibration when the water is sucked in.

The intake pipe can be L-shaped and arranged rotatably in a socket on an inner wall of the reservoir. Thus, the intake pipe can be adapted to different orientations of the device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5.1 schematically shows an optical sensor adjacent to an empty reservoir,

FIG. 5.2 schematically shows an optical sensor adjacent to a reservoir filled with water, FIG. 6 schematically shows an optical sensor in a perspective view, FIG. 7 schematically shows a condensate water removal device, FIG. 8 schematically shows a condensate water removal device, FIG. 9 schematically shows a sectional view of a sensor device, FIG. 10 schematically shows a sectional view of a cut out of a sensor device, FIG. 11 schematically shows an optical sensor in a perspective view, and FIG. 12 schematically shows a sectional view of an optical sensor adjacent to a reservoir filled with water.

DETAILED DESCRIPTION

Figure 1:
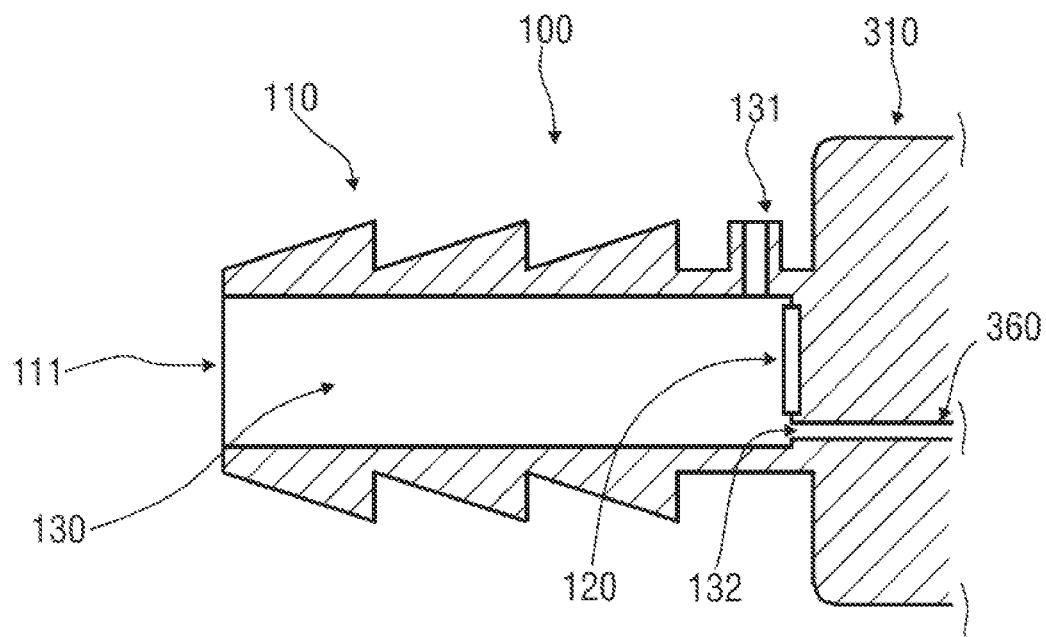
FIG. 1 schematically shows a sectional view of a sensor device.
Figure 2:
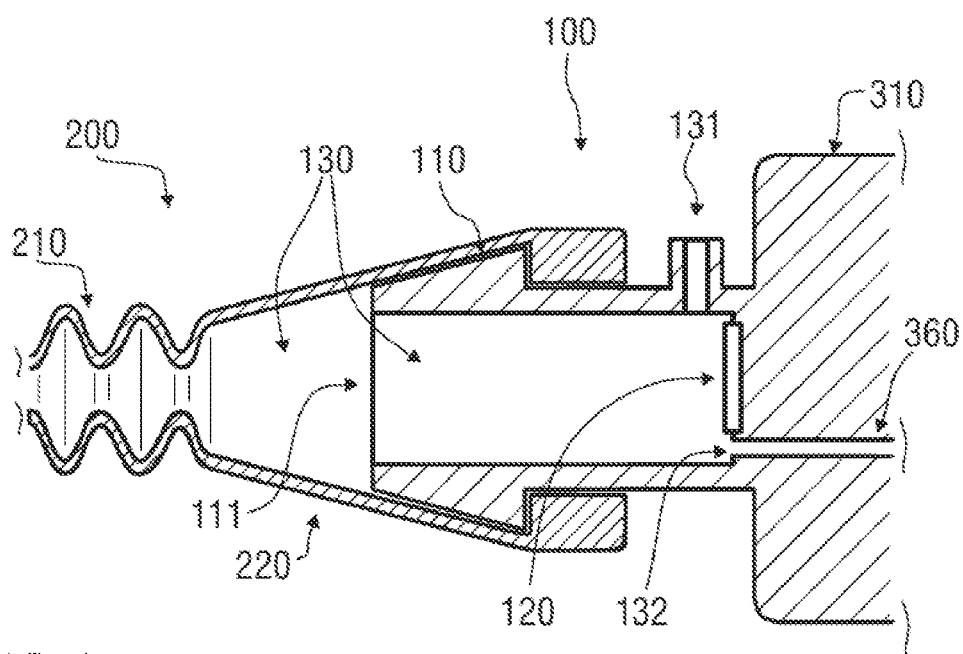
FIG. 2 schematically shows a sectional view of a sensor device.
Figure 3:
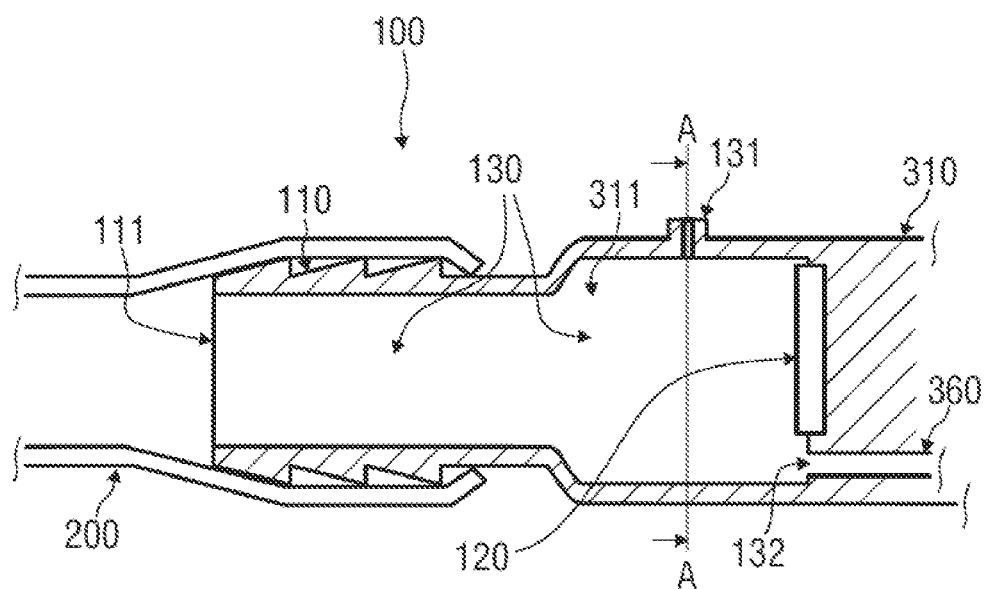
FIG. 3 schematically shows a sectional view of a sensor device.

FIGS. 1, 2 and 3 show sectional views of examples of a sensor device 100 of the present invention. In each one of these figures, an inlet connector 110 with an inlet opening 111 at its distal end is connected to a first housing 310 of, e.g., a condensate water removal device 300. From the inlet opening 111 a bore extends further inside the inlet connector 110, forming a reservoir 130, to receive water from a source of water. A sensor element 120 is arranged adjacent to or within the reservoir 130 to sense the presence and/or amount of water inside the reservoir 130. Possible electrical connections to other elements like, e.g., to an electronics unit. The inlet connector 110 further comprises a vent 131 close to or at a top side of the sensor device 100 to prevent a siphon effect. Close to or at a deepest point of the reservoir 130, the sensor device 100 comprises an outlet port 132 through which the reservoir 130 is in fluid communication with a fluid channel system 360, e.g., of the condensate water removal device 300.

The inlet connector 110 of FIG. 1 is of cylindrical shape and small enough in diameter, so that condensate water hoses, which are typically used to connect a drain port of a drip tray of a HVACR-system to a condensate water removal device 300 or a drain, can be plugged onto the inlet connector 110 easily. For improved tightness, the inlet connector 110 may be in the shape of a ribbed hose nozzle.

Further to FIG. 1, FIG. 2 shows a shorter inlet connector 110 with a wider diameter, to make room for a wider reservoir 130. A first condensate water hose 200 is shown connected to the inlet connector 110 and comprises a widened connection section 220, that fits to the inlet connector 110 and forms a part of the wider reservoir 130. Adjacent to that widened connection section 220 the hose 200 comprises a corrugated hose section 210, which allows for very flexible adaption to different installation geometries.

FIG. 3 shows an inlet connector 110 that is similar to that of FIG. 1. However, in this example, the bore through the inlet connector 110, which extends from the inlet opening 111, meets with an internal chamber 311 of the first housing 310. The inlet opening 111 and the internal chamber 311 together form the reservoir 130. Vent 131 and outlet port 132 are arranged at that internal chamber 311.

Figure 4:
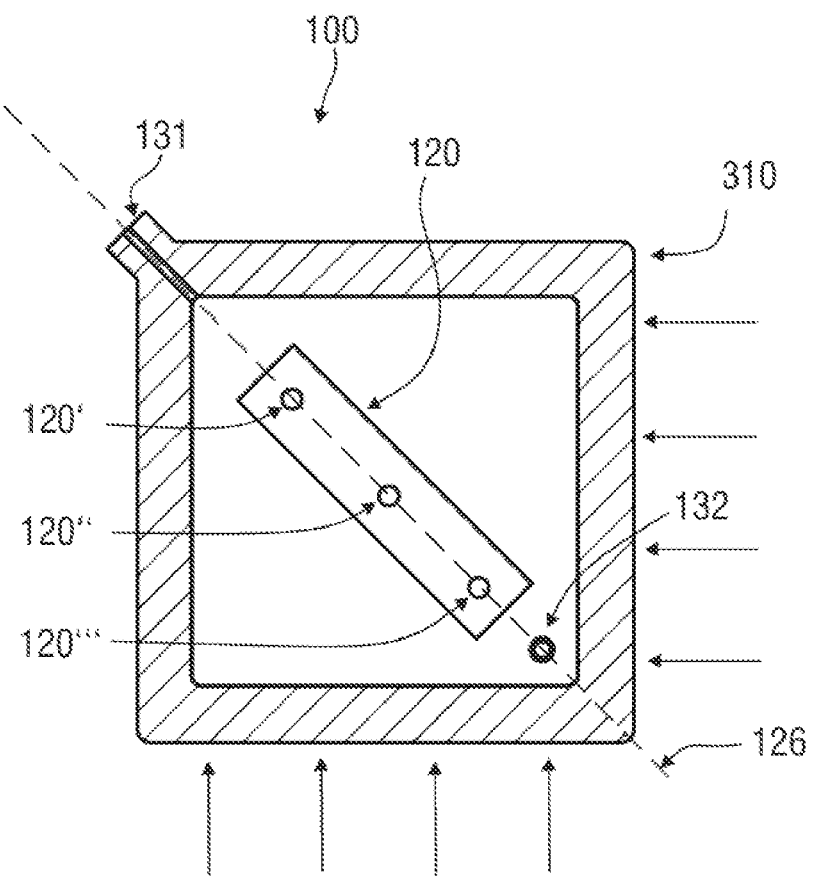
FIG. 4 schematically shows a sectional view of a reservoir.

FIG. 4 shows a sectional view through sectional plane A, as indicated in FIG. 3. The first housing 310 has a rectangular shape and the sensor element 120 is aligned along a measuring axis 126 that extends on a diagonal of the rectangular housing 310. The outlet port 132 is positioned in the lower right corner, while the vent 131 is positioned at the top left corner. In that arrangement, the first housing 310 may be installed in two different orientations: Either with the bottom side or the right side (in the perspective of this figure) on the ground, as indicated with arrows. In these two orientations, the vent 131 will be at the highest point of the reservoir 130 and can provide for an effective prevention of a siphon effect, without spilling water. At the same time, the outlet port 132 is always arranged at the lowest level of the reservoir 130. Therefore, the water can effectively be withdrawn from the reservoir 130, e.g., when the outlet port 132 is connected to a pump unit. The sensor device 100 may comprise multiple sensor elements 120', 120'', 120''' which are aligned at different positions along the measuring axis 126.

FIGS. 5.1 and 5.2 show a section of a sensor device 100 with an optical sensor element 120. The sensor element 120 is arranged at and/or held by a wall section of the inlet connector 110 or first housing 310. It comprises a sensor body 121 with a prism shaped cross section. At a back surface 123 of the sensor body 121 a light emitter 124, a light receiver 125 and a shield 127 are arranged. The shield 127 protrudes into the sensor body 121 to effectively shield the light receiver 125 from stray light. A substrate 128, e.g. a PCB, is arranged to hold the shown components.

In FIG. 5.1 the reservoir 130 is empty (or at least there is no water in close proximity to the sensor element 120). Light from the light emitter 124, as indicated by arrows, is directed towards a first reflection face 122. The material of the sensor body 121 (i.e. its refractive index) and the angle of incidence of the light is chosen such that total internal reflection occurs at the internal side of the reflection face 122, when there is no water in contact with the outer side of the reflection face 122. The light is reflected towards a second reflection face 122, where another total internal reflection occurs, such that essentially all light from the light emitter 124 is eventually directed towards the light receiver 125.

In FIG. 5.2 the reservoir 130 is filled with water (or at least a section of the reservoir 130 in close proximity to the sensor element 120). The Material (i.e. its refractive index) and the angle of incidence are chosen such that the condition for total internal refraction is not met, when the outer side of the reflection face 122 is in contact with water. Substantial amounts of light will be refracted out of the sensor body 121, at both reflection faces 122. Eventually, a much lower amount of light reaches the light receiver 125, as schematically indicated by the thin line of the arrow after the first reflection and the dotted line of the arrow after the second reflection.

FIG. 6 shows a sensor element 120, which is an optical sensor with two sensor elements 120', 120" in a perspective view. Each sensor element 120', 120" comprises a set of a light emitter 124', 124" and a light receiver 125', 125". The two sets of light emitters 124', 124" and light receivers 125', 125" are arranged at different longitudinal positions on a back surface of a joint sensor body 121. A cross-shaped shield 127 shields the light receivers 125', 125" from stray light of the corresponding light emitter 124', 124" of the same set as well as from stray light of the light emitter 124', 124" of the respective other set. A substrate 128 is arranged to hold the shown components, i.e., the light emitters 124', 124", light receivers 125', 125" and the shield 127.

Figure 7:
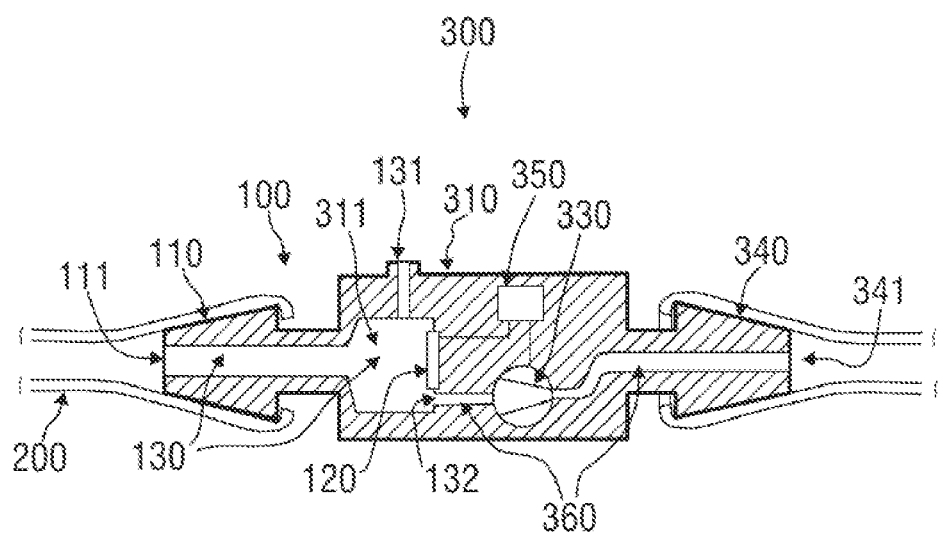
Figure 8:
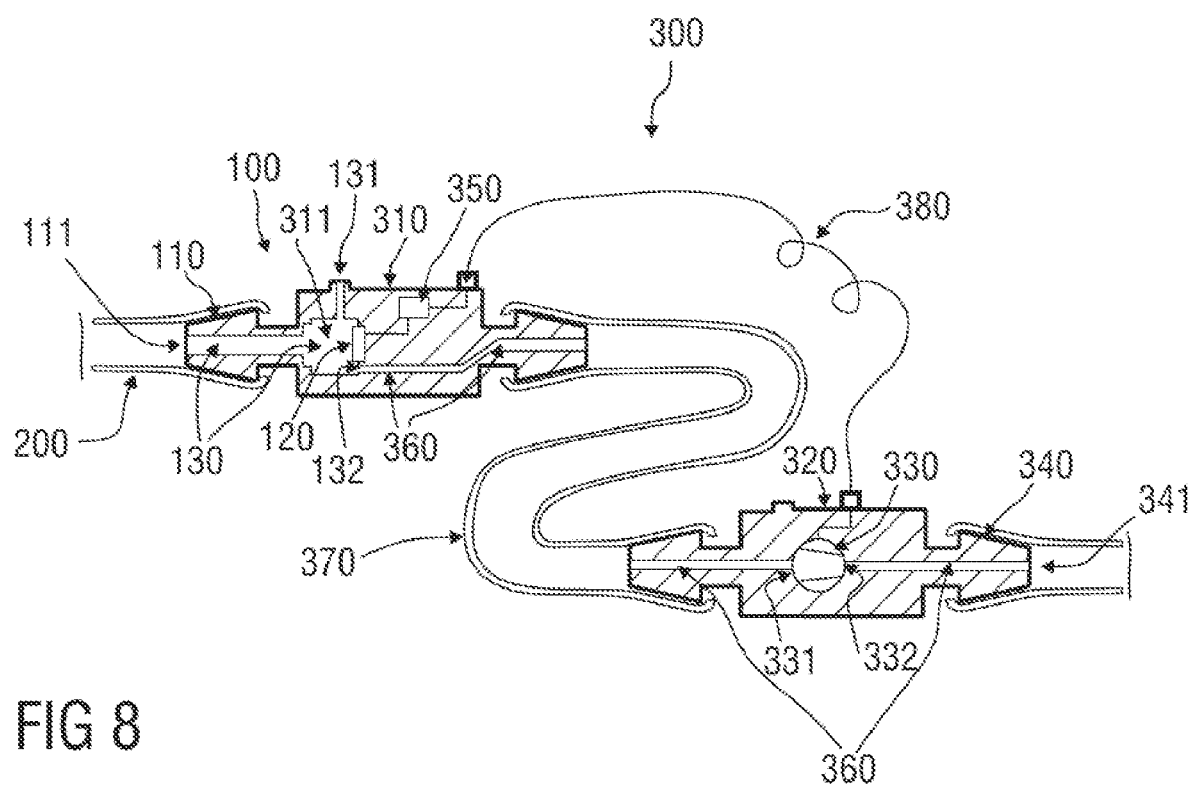

FIGS. 7 and 8 show examples of condensate water removal devices 300, each comprising an example of the sensor device 100. In both figures, the inlet connector 110 of the sensor device 100 is connected to a first housing 310 of the condensate water removal device 300. An inlet opening 111 and an internal chamber 311 of the housing 310 together form a reservoir 130 to receive water. A sensor element 120 is arranged adjacent to the reservoir 130. Furthermore, a vent 131 is arranged at the internal chamber 311. An outlet port 132 connects the reservoir 130 to a fluid channel system 360. The condensate water removal device 300 further comprises a pump unit 330, an electronics unit 350 and an outlet connector 340 with an outlet hole 341. The inlet connector 110 is plugged into a first hose through which water is received from a source of water, e.g. a drain port of a drip tray. The outlet connector 340 is also connected to another hose, through which water can be pumped towards a drain.

FIG. 7 shows a setup than comprises only one housing 310 with sensor device 100, electronics unit 350 and pump unit 330 attached or integrated to it. The electronics unit 350 is adapted to evaluate the sensor signal of the sensor element 120 to determine a presence and/or a level of water present in the reservoir 130 and control the pump unit 330 to withdraw that water by way of the fluid channel system 360.

Further to that, FIG. 8 shows a setup with a first housing 310 and a second housing 320, which may be referred to as a split-pump design. The first housing 310 comprises the sensor device 100 and the electronics unit 350, the second housing 320 comprises the pump unit 360 (and possible further electronics units). The fluid channel system 360 comprises a section that is formed by an intermediate hose 370. An electronic communication cable 380 is connected to both devices and provides for data and/or power transmission between the electronics units 350.

Figure 9:
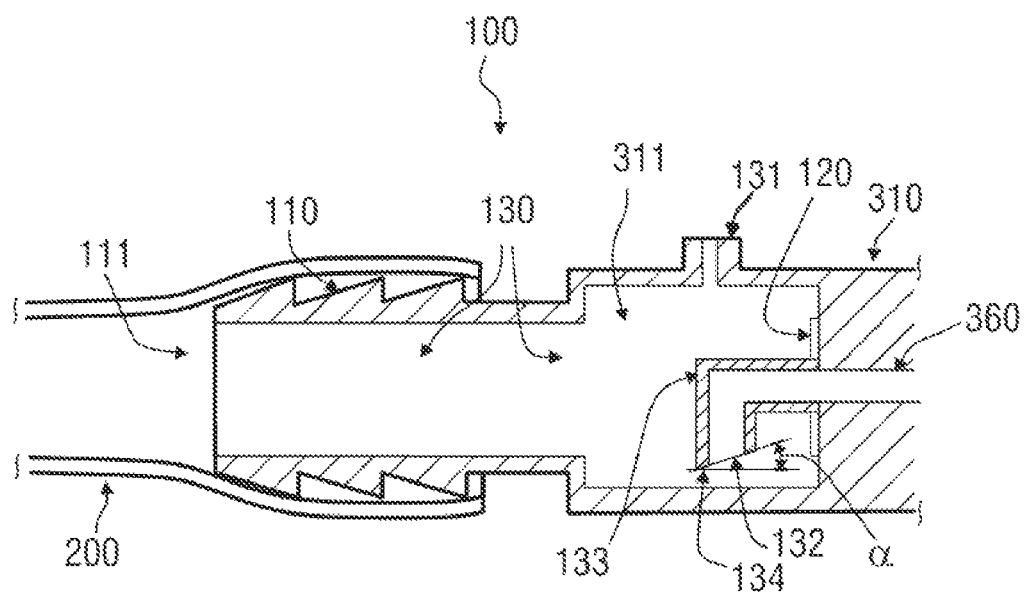

FIG. 9 schematically shows a sectional view of an example of a sensor device 100 of the present invention, wherein the sensor device 100 comprises an inlet opening 111 at its distal end, which is connected to a first housing 310 of, e.g., a condensate water removal device 300.

Further to the example shown in FIG. 1, the outlet port 132 is arranged at an end surface 134 of an L-shaped intake pipe 133. The end surface is tilted by an angle $\alpha=30°$ with respect to a horizontal plane.

In an example of the sensor device 100, the intake pipe 133 is arranged rotatably in a socket on an inner wall of the reservoir 130. Thus, the intake pipe 133 can be adapted to different orientations of the sensor device 100.

Figure 10:
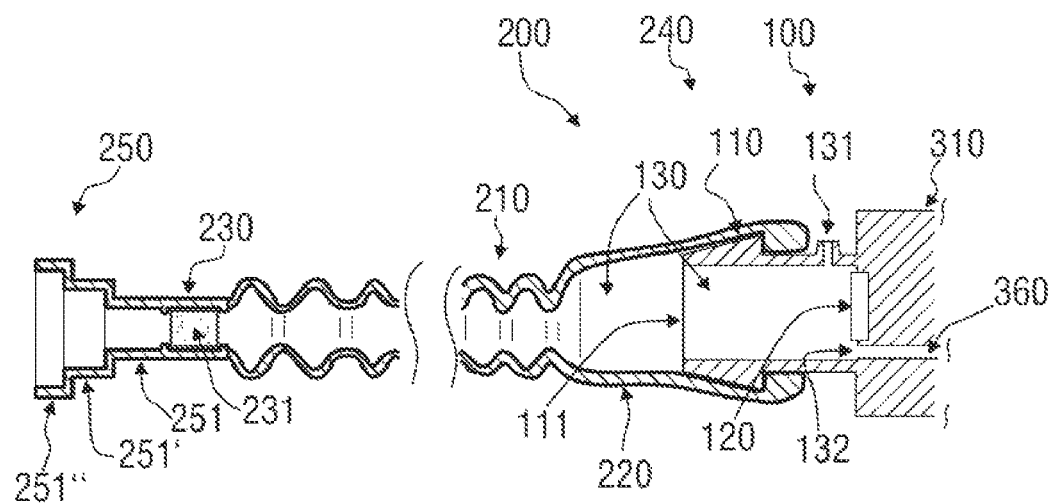

FIG. 10 schematically shows a sectional view of a sensor device 100, wherein the sensor device 100 comprises an inlet opening 111 at its distal end, which is connected to a first housing 310 of, e.g., a condensate water removal device 300.

Further to the example shown in FIG. 2, the sensor device 100 comprises a first condensate water hose 200 comprising a filtering device 230. For example, the filtering device 230 comprises a small sponge 231, which is pushed into the hose 200 near a distal end 250 of the hose 200.

The condensate water hose 200 comprises a proximal end section 240 adapted to connect to the inlet connector 110 and a distal end section 250 adapted to connect to a source of condensate water. The distal end 250 section comprises at least two connector end sections 251, 251', 251" with different opening widths, that adjoin each other. The end sections 251, 251', 251" are removably attached to the condensate water hose 200 and/or each other. For example, the hose 200 is made of rubber and the opening widths of the connector end sections 251, 251', 251" get smaller starting from the distal end 250. Thus, it is possible, that a user simply cuts off the sections that are too wide for a tight connection to a given source of water, for example with a carpet cutter.

Figure 11:
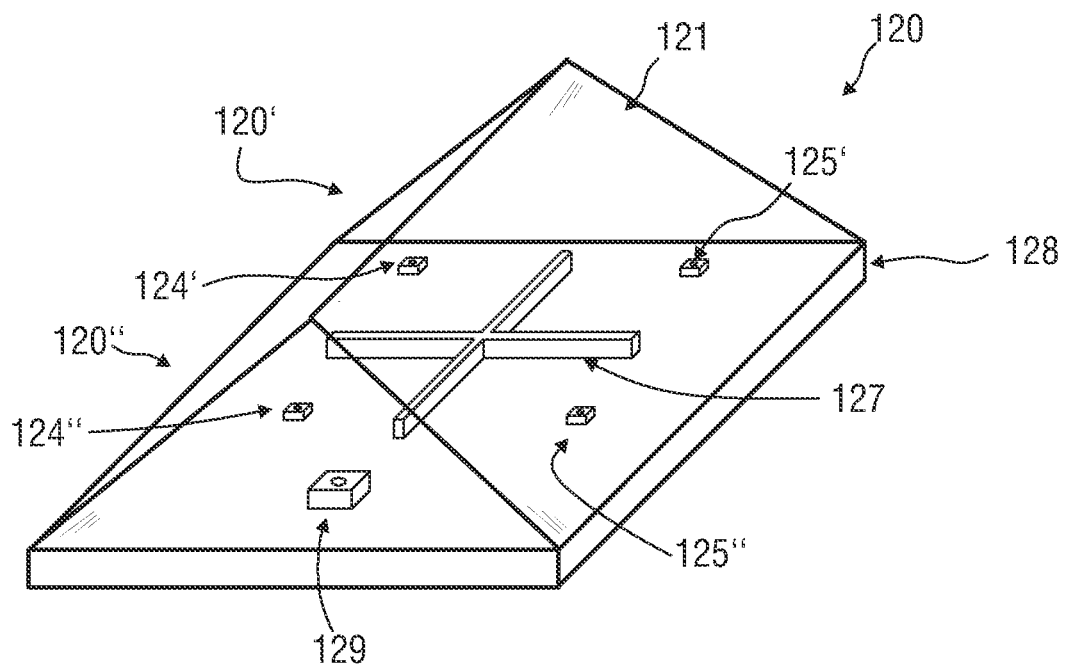

FIG. 11 schematically shows a sensor element 120, which is an optical sensor 120, in a perspective view.

Further to the example shown in FIG. 6, the optical sensor 120 further comprises an UV-light emitter 129, which is arranged on the substrate 128 with the light emitters 124', 124", light receivers 125', 125" and the shield 127.

The UV-light emitter 129 is adapted to emit ultra violet light onto the sensor elements 120', 120". With the UV-light emitter 129 directed onto the sensor elements 120', 120" the sensor elements 120', 120" are kept free of mould and/or algae.

The electronics unit 350 can control the UV-light emitter 129 to emit light onto the sensor elements 120', 120" periodically. The electronics unit 350 may be connected to the UV-light emitter 129 and to the sensor elements 120', 120" and may be adapted to control the UV-light emitter 129 to emit light onto the sensor elements 120', 120" only when the presence of water in the reservoir 130 is detected based on a signal of the sensor elements 120', 120".

The UV-light emitter 129 is arranged directly next to the light emitters 124', 124" and light receivers 125', 125" of the optical sensor on the same substrate 128. Thus, the transparent sensor body 121 can be illuminated from behind.

Figure 12:
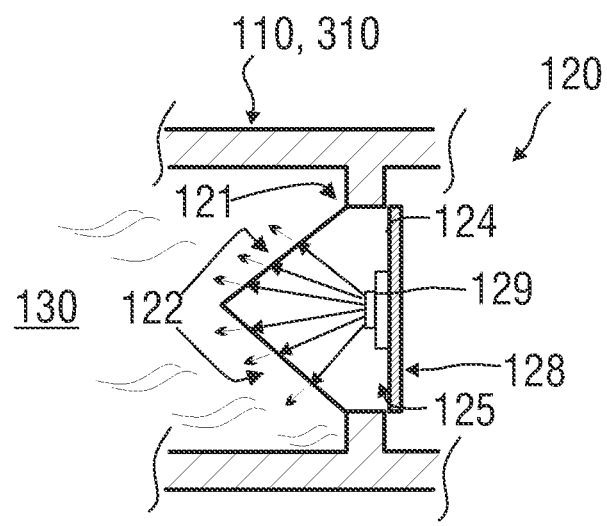

In this case, however, it could be that without water on the reflection face 122 the UV-light is also totally internally reflected. Thus, the sterilizing effect would be nil. Further, the emission of UV light only when there is water ensures that even with the described optical sensors the UV light really hits the surfaces that come into contact with water or penetrates it and that the water itself and other surfaces within the reservoir 130 can also be irradiated. This is shown in FIG. 12, which schematically shows a sensor element 120, which is an optical sensor, adjacent to a reservoir 130 filled with water.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor to detect water, the sensor comprising:
   an inlet connector with an inlet opening, the inlet connector being connectable to a source of water, the inlet opening forming at least a part of a reservoir for reception of water from the source of water;
   at least two sensor elements positioned within or adjacent to the inlet opening and/or the reservoir, such that the sensor elements protrude into the reservoir or form an interface of the reservoir and are positioned at different measuring positions along a measuring axis; and
   a vent in fluid communication with the reservoir, the vent venting the reservoir to the surrounding air to prevent a siphon effect,
   wherein at least one sensor element of the at least two sensor elements is an optical sensor,
   wherein the sensor further comprises a transparent sensor body, which is arranged adjacent to the reservoir and further comprises a prism-shaped or conical-shaped reflection face, which faces towards the reservoir and is in contact therewith,
   wherein the optical sensor comprises a set of one light emitter and one corresponding light receiver, which are arranged adjacent to or integrated into a back surface of the sensor body, which is essentially opposite to the reflection face,
   wherein light of the light emitter is directed towards the reflection face and the light receiver provides an electronic sensor signal that is indicative of an amount of light internally reflected back from the reflection face and received by the light receiver,
   wherein an electronics unit is connected to the optical sensor and is adapted to determine whether water is present or absent at the reflection face, based on the electronic sensor signal of the light receiver,
   wherein at least two of the optical sensor are provided on the sensor body,
   wherein each of the at least two optical sensors comprises a set of one light emitter and one corresponding light receiver,
   wherein the sensor body has an elongate shape and extends along or in parallel to the measuring axis,
   wherein the sets of light emitters and light receivers of the at least two optical sensors are arranged adjacent to or integrated into the back surface of the sensor body, which is essentially opposite to the reflection face, facing away from the reservoir,
   wherein the sets of light emitters and light receivers are positioned at different measuring positions along the measuring axis,
   wherein the light of the light emitters is directed towards the reflection face and the light receivers provide electronic sensor signals that are indicative of an amount of light internally reflected back from the reflection face and received by the light receivers, and
   wherein the electronics unit is connected to the at least two optical sensors and is adapted to determine whether water is present or absent at each measuring position at the reflection face, based on the electronic sensor signals of the light receivers.

2. The sensor according to claim 1, wherein the reservoir is further formed at least in part by a first condensate water hose, that connects the inlet connector to the source of water.

3. The sensor according to claim 2, wherein the first condensate water hose comprises a corrugated hose section.

4. The sensor according to claim 1, wherein the inlet connector is arranged on a first housing of a condensate water remover, wherein the reservoir is further formed at least in part by an internal chamber of the first housing and the internal chamber is arranged adjacent to and in fluid communication with the inlet opening of the inlet connector.

5. The sensor according to claim 1, further comprising a shield that is arranged between the light emitter and the light receiver of at least one optical sensor or between the light emitters and light receivers of different optical sensors.

6. The sensor according to claim 1, further comprising an ultra violet light emitter that is adapted to emit ultra violet light onto the at least one sensor element.

7. The sensor according to claim 6, wherein an electronics unit controls the ultra violet light emitter to emit light onto the at least one sensor element periodically, and/or wherein the electronics unit is connected to the ultra violet light emitter and to the at least one sensor element and is adapted to control the ultra violet light emitter to emit light onto the at least one sensor element only when the presence of water in the reservoir is detected based on a signal of the at least one sensor element.

8. A condensate water remover to remove water from a heating, ventilation, air conditioning and refrigeration system, the condensate water remover comprising:
   a sensor according to claim 1;
   at least a first housing;
   a pump;
   an outlet connector with an outlet hole; and
   an electronics unit,
   wherein the inlet connector of the sensor is arranged on the first housing,
   wherein the pump is adapted to pump water out of the reservoir of the sensor via a fluid channel system that is connected to an outlet port of the reservoir and towards the outlet connector, and
   wherein the electronics unit is electronically connected to the at least one sensor element and adapted to determine a presence or absence of water and/or a level of water within the reservoir and to provide a control signal, based on the detected presence and/or level of condensate water, to the pump.

9. The condensate water remover according to claim 8, wherein the first housing has a rectangular or square cross-section, wherein the measuring axis of the sensor extends along a diagonal line of the cross-section, and wherein the outlet port of the reservoir is positioned at one of the ends of the diagonal line.

10. The condensate water remover according to claim 8, wherein the outlet port is arranged at an end surface of an intake pipe, and wherein the end surface is tilted by an angle of 30° with respect to a horizontal plane.

11. A sensor to detect water, the sensor comprising:

an inlet connector with an inlet opening, the inlet connector being connectable to a source of water, the inlet opening forming at least a part of a reservoir for reception of water from the source of water;

at least one sensor element positioned within or adjacent to the inlet opening and/or the reservoir, such that the sensor element protrudes into the reservoir or forms an interface of the reservoir; and a vent in fluid communication with the reservoir, the vent remaining open to continuously vent the reservoir to the surrounding air to prevent a siphon effect, wherein the reservoir is further formed at least in part by a first condensate water hose that connects the inlet connector to the source of water, wherein the first condensate water hose comprises a corrugated hose section, wherein the first condensate water hose comprises:
   a proximal end section adapted to connect to the inlet connector; and
   a distal end section adapted to connect to the source of water,
wherein the distal end section comprises at least two connector sections with different opening widths that adjoin each other, the opening width of each respective connector section being a width of an opening that extends through each respective connector section in a length direction of the first condensate water hose, and
wherein the connector sections are removably attached to the first condensate water hose and/or each other.

12. The sensor according to claim 11, further comprising at least two sensor elements, wherein each sensor element is adapted to generate an electric sensor signal, wherein the electric sensor signal is indicative of at least one of:
   a presence or absence of water at a sensing surface of the sensor element,
   a pressure of a fluid in contact with the sensor element,
   a temperature of a fluid in contact with the sensor element,
   a thermal capacity of a fluid in contact with the sensor element, and
   a conductivity of a fluid in contact with the sensor elements.

13. The sensor according to claim 11, wherein the at least one sensor element is an optical sensor, wherein the optical sensor further comprises a transparent sensor body, which is arranged adjacent to the reservoir and further comprises a prism-shaped or conical-shaped reflection face, which faces towards the reservoir and is in contact therewith, wherein the optical sensor comprises a set of one light emitter and one corresponding light receiver, which are arranged adjacent to or integrated into a back surface of the sensor body, which is essentially opposite to the reflection face, wherein light of the light emitter is directed towards the reflection face and the light receiver provides an electronic sensor signal that is indicative of an amount of light internally reflected back from the reflection face and received by the light receiver, and wherein an electronics unit is connected to the optical sensor and is adapted to determine whether water is present or absent at the reflection face, based on the electronic sensor signal of the light receiver.

14. The sensor according to claim 13, further comprising at least two optical sensors provided on the sensor body, the at least two optical sensors being positioned at different measuring points along a measuring axis, wherein each of the at least two optical sensors comprises a set of one light emitter and one corresponding light receiver, wherein the sensor body has an elongate shape and extends along or in parallel to the measuring axis, wherein both of the sets of light emitters and light receivers are arranged adjacent to or integrated into the back surface of the sensor body, which is essentially opposite to the reflection face, facing away from the reservoir, wherein the sets of light emitters and light receivers are positioned at different measuring positions along the measuring axis, wherein the light of the light emitters is directed towards the reflection face and the light receivers provide electronic sensor signals that are indicative of an amount of light internally reflected back from the reflection face and received by the light receivers, and wherein the electronics unit is connected to the at least two optical sensors and is adapted to determine whether water is present or absent at each measuring position at the reflection face, based on the electronic sensor signals of the light receivers.

15. A condensate water remover to remove water from a heating, ventilation, air conditioning and refrigeration system, the condensate water remover comprising:
   a sensor according to claim 11;
   at least a first housing;
   a pump;
   an outlet connector with an outlet hole; and
   an electronics unit,
   wherein the inlet connector of the sensor is arranged on the first housing,
   wherein the pump is adapted to pump water out of the reservoir of the sensor via a fluid channel system that is connected to an outlet port of the reservoir and towards the outlet connector, and
   wherein the electronics unit is electronically connected to the at least one sensor element and adapted to determine a presence or absence of water and/or a level of water within the reservoir and to provide a control signal, based on the detected presence and/or level of condensate water, to the pump.

* * * * *